(12) United States Patent
Kim et al.

(10) Patent No.: US 11,781,720 B2
(45) Date of Patent: Oct. 10, 2023

(54) BLACK IMAGE TYPE HIDDEN LIGHT LAMP AND VEHICLE HAVING THE SAME (71) Applicants: HYUNDAI MOTOR COMPANY, Seoul (KR); KIA CORPORATION, Seoul (KR); HYUNDAI MOBIS CO., LTD., Seoul (KR)

(72) Inventors: Hyeong-Seon Kim, Anyang-si (KR); Hwi-Eon Kim, Hwaseong-si (KR); Wan-Ku Yoon, Cheonan-si (KR); Gil-Won Han, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/880,241

(22) Filed: Aug. 3, 2022

(65) Prior Publication Data
US 2023/0075681 A1 Mar. 9, 2023

(30) Foreign Application Priority Data

Sep. 7, 2021 (KR) ........................ 10-2021-0118842

(51) Int. Cl.
| *F21S 41/20* | (2018.01) |
| *F21S 41/40* | (2018.01) |
| *B60Q 1/04* | (2006.01) |
| *F21V 3/06* | (2018.01) |
| *F21S 41/663* | (2018.01) |
| *B60Q 1/00* | (2006.01) |

(52) U.S. Cl.
CPC .............. *F21S 41/285* (2018.01); *B60Q 1/04* (2013.01); *F21S 41/40* (2018.01); *F21S 41/663* (2018.01); *F21V 3/06* (2018.02); *B60Q 1/0047* (2013.01)

(58) Field of Classification Search
CPC .......... F21S 43/14; F21S 43/245; F21S 43/30; F21S 43/315; F21S 43/33; F21S 41/285; F21S 41/663; F21S 41/40
See application file for complete search history.

(56) References Cited

U.S. PATENT DOCUMENTS 8,333,493 B2* 12/2012 Taleb-Bendiab ..... G02B 6/0045
362/555
10,634,300 B2* 4/2020 Fukui .................... F21S 43/245
(Continued)

FOREIGN PATENT DOCUMENTS

JP 2018-185945 A 11/2018

*Primary Examiner* — Matthew J. Peerce
(74) *Attorney, Agent, or Firm* — MCDONNELL BOEHNEN HULBERT & BERGHOFF LLP (57) ABSTRACT A black image type hidden light system applied to a vehicle is composed of a control module coupled to a hidden lamp module in which an outer lens, an inner lens, and a light source are assembled in a lamp housing, and a black color surface of the outer lens covers an inner space of the lamp housing to block the exposure to the outside and transmits the light fully reflected to the inner lens to the outside, thereby forming a deposition image in black when not lit and a lamp image or a lighting image when lit, and in particular, optimizes a light transmittance with an amount of addition of a carbon black material mixed with a polycarbonate (PC) material, thereby substantially enabling the mass-production beyond the limitation of an AL deposition image.

13 Claims, 8 Drawing Sheets

(56) References Cited

U.S. PATENT DOCUMENTS

| | | | |
|---|---|---|---|
| 10,859,230 B2* | 12/2020 | Paroni | F21S 43/14 |
| 11,377,035 B2* | 7/2022 | Iseki | F21S 43/245 |
| 2016/0116666 A1* | 4/2016 | Sato | G02B 6/0078 |
| | | | 362/509 |
| 2022/0120402 A1* | 4/2022 | Woodgate | B60Q 1/247 |
| 2022/0308206 A1* | 9/2022 | Hirano | G01S 7/027 |
| 2023/0003360 A1* | 1/2023 | Studeny | F21S 43/245 |

* cited by examiner

FIG. 1

<K ENLARGED PERSPECTIVE DIAGRAM>

FIG. 3

<CARBON BLACK(a)>

<COMPOUND PC(b)>

<TRANSMITTANCE OPTIMIZATION CONDITION(c)>

<CARBON BLACK ADDED PC LENS (TRANSMITTANCE 15% PC)(d)>

BLACK IMAGE TYPE HIDDEN LIGHT LAMP AND VEHICLE HAVING THE SAME

CROSS REFERENCE TO RELATED APPLICATIONS

This application claims priority to Korean Patent Application No. 10-2021- 0118842, filed on September 7, 2021, which is incorporated herein by reference in its entirety.

BACKGROUND

Field of the Disclosure

The present disclosure relates to a hidden light lamp, and particularly, to a vehicle to which a black image type hidden light lamp that resolves the limitation of a first generation hidden lighting method using an aluminum (AL) deposition is applied.

Description of Related Art

Generally, a hidden light for a vehicle has the characteristics of implementing a lamp image (i.e., lighting image) when a light source is lit and changing it into a deposition image (i.e., appearance design image) when not lit.

For example, the hidden light is composed of a lamp housing, a lamp light source, and an AL deposition lens, in which the AL deposition lens reflects outside light while transmitting the light of the light source inside the lamp with an AL deposition layer. In this case, as the lamp light source, a light emitting diode (LED) (or bulb) is applied, and the AL deposition layer is made of an aluminum (AL) material.

Therefore, the hidden light can implement a lamp image together with the lamp by transmitting the light of the light source by the outer lens when the lamp is lit, whereas changing it into a deposition image using a visual texture of the deposition layer by outside light such as sunlight or light of nearby light source reflected by the outer lens when the lamp is not lit.

As described above, the hidden light can implement the vehicle lamp as a design element, thereby enhancing the effects of various luxurious lamp images and sophisticated and state-of-the-art images in a vehicle, in particular, an electric vehicle, and largely contributing to the improvement in vehicle merchantability.

However, the hidden light is based on the AL deposition layer of the outer lens and therefore, inevitably has monotony in which the deposition image is implemented by only the visual texture of the AL when the lamp is not lit, and furthermore, is inevitably vulnerable to the homogeneity between a deposition color and a color of a vehicle body.

In particular, recently, there is a need for a new deposition material or the material and structure of a new outer lens beyond the limitation of the first generation hidden light having the dependency of the AL on the deposition layer in that the vehicle design preemptively reflects a consumer trend beyond meeting consumer needs.

The contents described in Description of Related Art are to help the understanding of the background of the present disclosure, and may include what is not previously known to those skilled in the art to which the present disclosure pertains.

SUMMARY

Therefore, an object of the present disclosure considering the above point is to provide a black image type hidden light lamp and a vehicle having the same, which can overcome the limitation of the uniform AL deposition image by implementing black images using a black outer lens in a state where a light source is not lit, thereby easily reflecting a new consumer trend and meeting the consumer needs with new deposition images, and in particular, substantially enable the mass-production using a polycarbonates (PC) material in implementing the black, thereby also leading to a new merchantability effect called a second generation hidden light for customers.

A hidden light lamp according to the present disclosure for achieving the object includes a lamp housing having a light source provided in an inner space thereof, an outer lens whose exposure to the outside is blocked by covering the inner space by a color exposure surface that transmits the light generated by the light source at a light transmittance; and an inner lens configured to send the light toward the outer lens by fully reflecting the light in the inner space.

In an exemplary embodiment, the outer lens forms a deposition image with the black of the color exposure surface when the light source is not lit.

In an exemplary embodiment, the outer lens forms the black color surface by mixing a polycarbonates material with a carbon powder material, the black color surface has the light transmittance adjusted by an amount of addition of the carbon powder material, and as the light transmittance, a transmittance of 15% is applied as an optimized value.

In an exemplary embodiment, the inner lens is made of a polymethyl methacrylate (PMMA) material, and the inner lens forms an image pattern formed as a lighting image by an optic projection when the light source is lit.

In an exemplary embodiment, the inner lens is formed so that the optic projection has a thickness difference with a lens body forming full reflection, the thickness difference causes the fully reflected light of the optic projection to be relatively stronger than the light of the lens body, and the image pattern is formed in a continuous "X" arrangement.

In an exemplary embodiment, the inner lens forms a corrosion surface at a location matching with the optic projection on the lens body, and the corrosion surface forms a pattern on the image pattern in any one of an embossing shape, a figure pattern, a pentagon pattern, a wave pattern, and straight pattern.

In an exemplary embodiment, the inner lens is composed of a first layer lens and a second layer lens arranged at an interval, and each of the first layer lens and the second layer lens forms different image patterns.

In an exemplary embodiment, the first layer lens and the second layer lens overlap the image patterns when the light source is lit to form them as the lighting images.

In an exemplary embodiment, the optic projection of the first layer lens has a divergence structure and spreads the light to the outer lens, and the optic projection of the second layer lens has a convergence structure and collects the light into the first layer lens.

In an exemplary embodiment, each of the first layer lens and the second layer lens is provided with the light source, and the light source is located on an upper portion and a lower portion of the first layer lens and the second layer lens.

In an exemplary embodiment, the outer lens, the inner lens, and the light source are assembled in the lamp housing and configured as the hidden lamp module, and the hidden lamp module is coupled to the control module and the lighting of the light source is controlled.

In an exemplary embodiment, the inner lens and the light source are configured as a communication lamp, and the communication lamp is composed of a signal switching unit configured to select a power supply, a first direction indication module connecting a first light source of the light source located on the first layer lens of the inner lens to the signal switching unit, and a second direction indication module connecting a second light source of the light source located on the second layer lens of the inner lens to the signal switching unit.

In an exemplary embodiment, the light of the first light source illuminates the image pattern of the optic projection formed on the first layer lens, the light of the second light source illuminates the image pattern of the optic projection formed on the second layer lens, and a shape of the image pattern of the first layer lens and a shape of the image pattern of the second layer lens indicate a left direction and a right direction of a vehicle proceeding direction.

In an exemplary embodiment, the outer lens is configured as an outer lens of a position lamp (PSTN), and the position lamp (PSTN) is located in an intermediate section between a left daytime running lamp (DRL) and a right daytime running lamp (DRL).

Further, a vehicle according to the present disclosure for achieving the object includes a hidden lamp module in which light of a light source is fully reflected to an inner lens formed with an optic projection in an inner space of a lamp housing whose exposure to the outside is blocked at a light transmittance of a color exposure surface of an outer lens, and the outer lens transmits an image pattern of the optic projection at the light transmittance and a lamp configured to form a color of the color exposure surface in the same color as a vehicle body.

In an exemplary embodiment, the lamp is a hidden light lamp, and the hidden light lamp forms a deposition image with the color exposure surface in a state of being not lit, and forms a lamp image with the image pattern in a state of being lit, by the hidden lamp module.

In an exemplary embodiment, the lamp is a communication lamp, and in a state where the communication lamp is lit, the hidden lamp module forms a lamp image with the image pattern, and the lamp image indicates a left direction and a right direction of a vehicle proceeding direction.

In an exemplary embodiment, the lamp is a composite lamp in which a position lamp (PSTN) is located between a left daytime running lamp (DRL) and a right daytime running lamp (DRL), and in a state where the position lamp (PSTN) is not lit, the hidden lamp module forms a deposition image with the color exposure surface.

The black image type hidden light lamp applied to the vehicle according to the present disclosure implements the following operations and effects.

First, it is possible to change the lamp system for vehicle into the second generation hidden light by implementing the black beyond the limitation of the first generation hidden light implemented by only the AL deposition image when the lamp is not lit. Second, it is possible to manufacture the outer lens of the lamp as the lens that implements black with the polycarbonate (PC) material containing the carbon powder, thereby enabling the substantial mass-production. Third, it is possible to provide the merchantability element appealable to the consumers due to the lens concept with the non-lighting type black bezel feeling that is differentiated from the conventional one implemented by the AL deposition image. Fourth, it is possible to have the inner lens composed of the plurality of layer lenses inside the outer lens, thereby implementing variable feelings according to the situations through the implementation of different pattern images for each layer and providing the new fun element to the consumers. Fifth, the hidden image type hidden light according to the present disclosure can be applied as the basic technology of generating the communication signal between vehicles through different lamp images according to the situations by signaling the deposition image pattern in the situation where the importance of the communication lamp function is on the rise upon autonomous traveling of the autonomous vehicle. Sixth, it is possible to lead to the merchantability effect for the customer using the second generation hidden light of the black image type hidden light concept, thereby largely enhancing the vehicle competitiveness.

DETAILED DESCRIPTION

Hereinafter, an exemplary embodiment of the present disclosure will be described in detail with reference to the accompanying exemplary drawings, and the exemplary embodiment is one example and can be implemented by those skilled in the art to which the present disclosure pertains in various different forms, and therefore, is not limited to the exemplary embodiment described herein.

Figure 1:
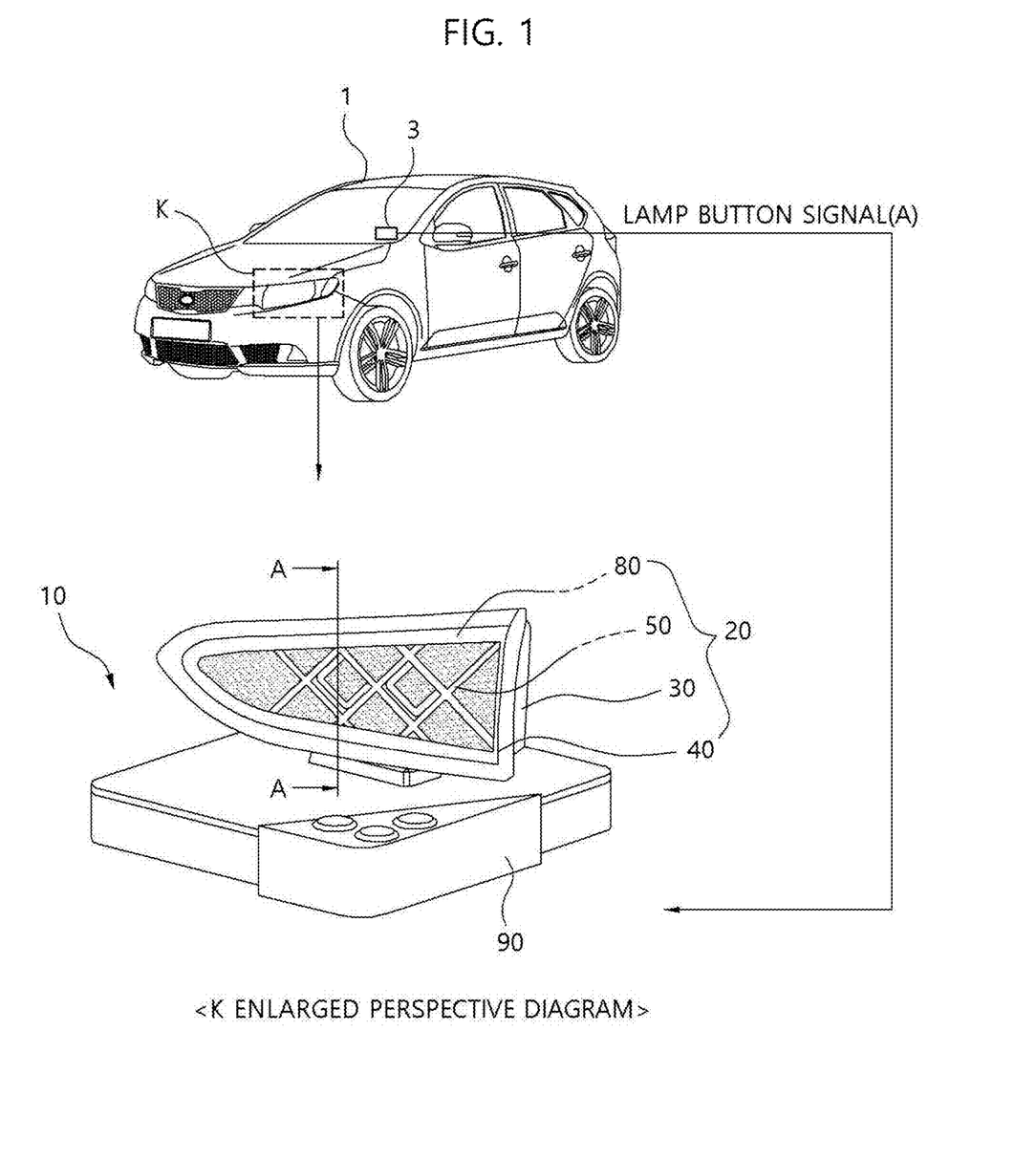
FIG. 1 is a configuration diagram of a black image type hidden light lamp applied to a vehicle according to the present disclosure.

Referring to FIG. 1, a vehicle 1 is provided with a hidden light lamp 10.

Specifically, the hidden light lamp 10 is composed of a hidden lamp module 20 and a control module 90. In this case, the hidden light lamp 10 is exemplified as a head lamp provided on the front of a vehicle but can be a tail lamp provided on the rear of the vehicle, and can be any one of a fog lamp, a turn signal lamp, a side repeater, an emergency light, a brake lamp, and a back-up lamp.

For example, the hidden lamp module 20 is composed of a lamp housing 30 constituting the entire shape of the lamp, an outer lens 40 exposed to the outside, an inner lens 50 configured to fully reflect the light of a light source 80 in an inner space of the lamp housing 30 to send it to the outer lens 40, and the light source 80 accommodated in the inner space of the lamp housing 30 to generate light upon a lighting control of a control module 90.

In particular, the outer lens 40 is made of a polycarbonates (PC) material, and in particular, forms black obtained by transmitting about 10 to 20% of the light with the polycarbonate (PC) material containing carbon black.

The inner lens 50 (i.e., first and second layer lenses 50-1, 50-2) (see FIG. 2) is made of a polymethyl methacrylate (PMMA) material, and forms a clear state where the light transmittance is 90 to 100%.

Further, as the light source 80, a light emitting diode (LED) or an LED chip is applied, but a bulb can be applied. In this case, the LED chip (or chip LED) is an LED configured to generate light when electricity is conducted in a principle of a PN junction LED and is provided with a printed circuit board (PCB).

For example, the control module 90 is coupled to the lamp housing 30 by a control case to be integrated with the hidden lamp module 20, and to support a lower portion of the hidden lamp module 20.

Therefore, the control module 90 is the same as a general lamp control unit or a control module applied to an AL-applied first generation hidden light. However, there is a difference in which the control module 90 is provided on a driver seat of the vehicle 1 and connected with a lamp button 3 configured to generate a lamp button signal (A), and therefore, a control logic or a program embedded in a memory reflects a lamp turn-off signal (a) of the lamp button 3/a primary illumination pattern signal (b)/a secondary illumination pattern signal (c) (see FIG. 6), a direction indication signal (d) (see FIG. 7), and a PSTN lighting signal (e) (see FIG. 8).

Meanwhile, FIGS. 2 to 5 show a structure and a modified structure of a component of the hidden lamp module 20.

Figure 2:
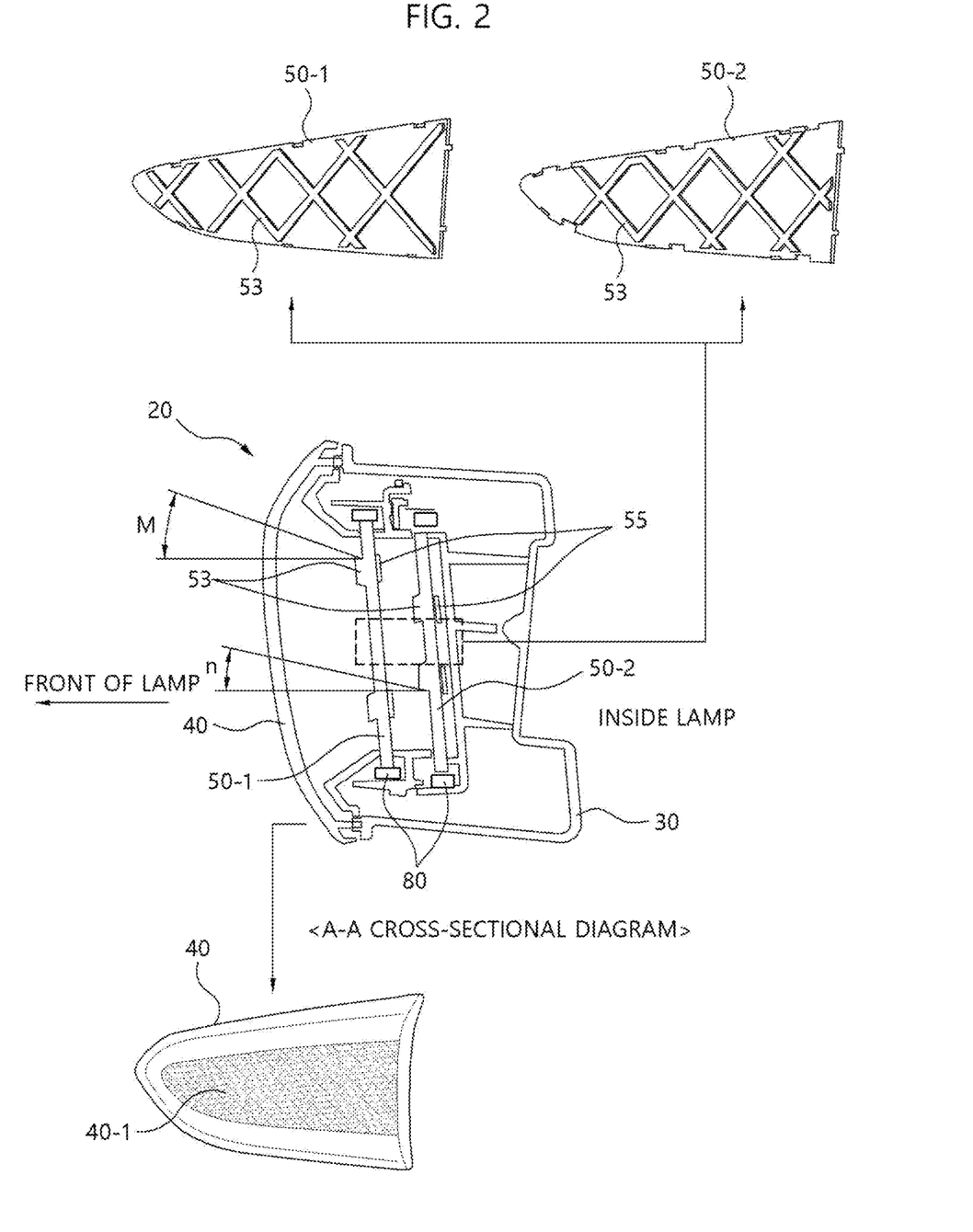
FIG. 2 is a configuration diagram of a hidden lamp module applied to the hidden light lamp according to the present disclosure.

Referring to an A-A cross-sectional diagram of FIG. 2, the hidden lamp module 20 uses the lamp housing 30 to couple and assemble the outer lens 40 and the inner lens 50.

For example, the lamp housing 30 has a front portion coupled to a protrusion rib structure of the outer lens 40 in a fitting or hook-latching structure so that the outer lens 40 is assembled to be easily detached or attached, and has an inner space cross-sectional structure of a bracket shape and has the inner lens 50 and the light source 80 coupled and assembled in the inner space thereof.

For example, the outer lens 40 is formed with an externally exposed surface as a black exposure surface 40-1 having the light transmittance of about 10 to 20% to be formed in a structure of fitting into the shape of the lamp, and in particular, has the protrusion rib structure formed on a rear portion of the outer lens body (i.e., portion opposite to the front portion exposed to the outside) to be detached or attached by being coupled with the latching structure of the lamp housing 30.

For example, the inner lens 50 is assembled by penetrating or fitting a part of upper/lower portions thereof into the inner space cross-sectional structure of the lamp housing 30, and located in the inner space of the lamp housing 30 in a front inclination and vertical arrangement state (e.g., about 5 to)10°. In this case, the inner lens 50 is not formed in the front inclination and vertical arrangement state and can be vertically arranged at 90°.

In particular, the inner lens 50 is composed of a first layer lens 50-1 and second layer lens 50-2, in which the first layer lens 50-1 is arranged behind the outer lens 40 and therefore, the second layer lens 50-2 is arranged behind the second layer lens 50-2.

Therefore, the outer lens 40, the first layer lens 50-1, and the second layer lens 50-2 are formed in a structure of being arranged in parallel in a width direction of the lamp hosing 30 (i.e., front/rear direction of the lamp), and the parallel arrangement structure is formed in the order of the outer lens 40-the first layer lens 50-1-the second layer lens 50-2 and has a predetermined interval with respect to each other.

Specifically, each of the first and second layer lenses 50-1, 50-2 has an optic projection 53 and a corrosion surface 55 formed on a lens body 51 that forms a layer lens body, in which the optic projection 53 is formed on one side surface (i.e., front surface facing the outer lens 40) of the lens body 51, and the corrosion surface 55 is formed on the other side surface (i.e., front surface facing the second layer lens 50-2) of the lens body 51.

In particular, the optic projection 53 is formed in an image pattern that makes the lamp image or the lighting image viewable from the outside. In this case, the image pattern is formed in a continuous "X" arrangement, and various shapes other than "X" can be applied if necessary. Further, the corrosion surface 55 is formed according to the image pattern of the optic projection 53 at the same location as the location where the optic projection 53 is formed.

Further, the optic projection 53 of the first layer lens 50-1 is formed in a divergence structure at an acute angle with respect to one side (i.e., toward the center) and therefore, the light from the optic projection 53 can be spread into the inner space and widely spread to the outer le 40, whereas the optic projection 53 of the second layer lens 50-2 is formed in a convergence structure at an acute angle with respect to one side (i.e., toward the center) and therefore, the light from the optic projection 53 can be collected toward the first layer lens 50-1.

For example, the light source 80 is seated on and fixed to the inner space cross-sectional structure of the lamp housing 30, and the light is generated by the power supply to form a lamp lighting state. In particular, the light source 80 is located above/under the first layer lens 50-1 and the second layer lens 50-2, respectively, and composed of the light source 80 for the first layer lens 50-1 and the light source 80 for the second layer lens 50-2.

Figure 3:
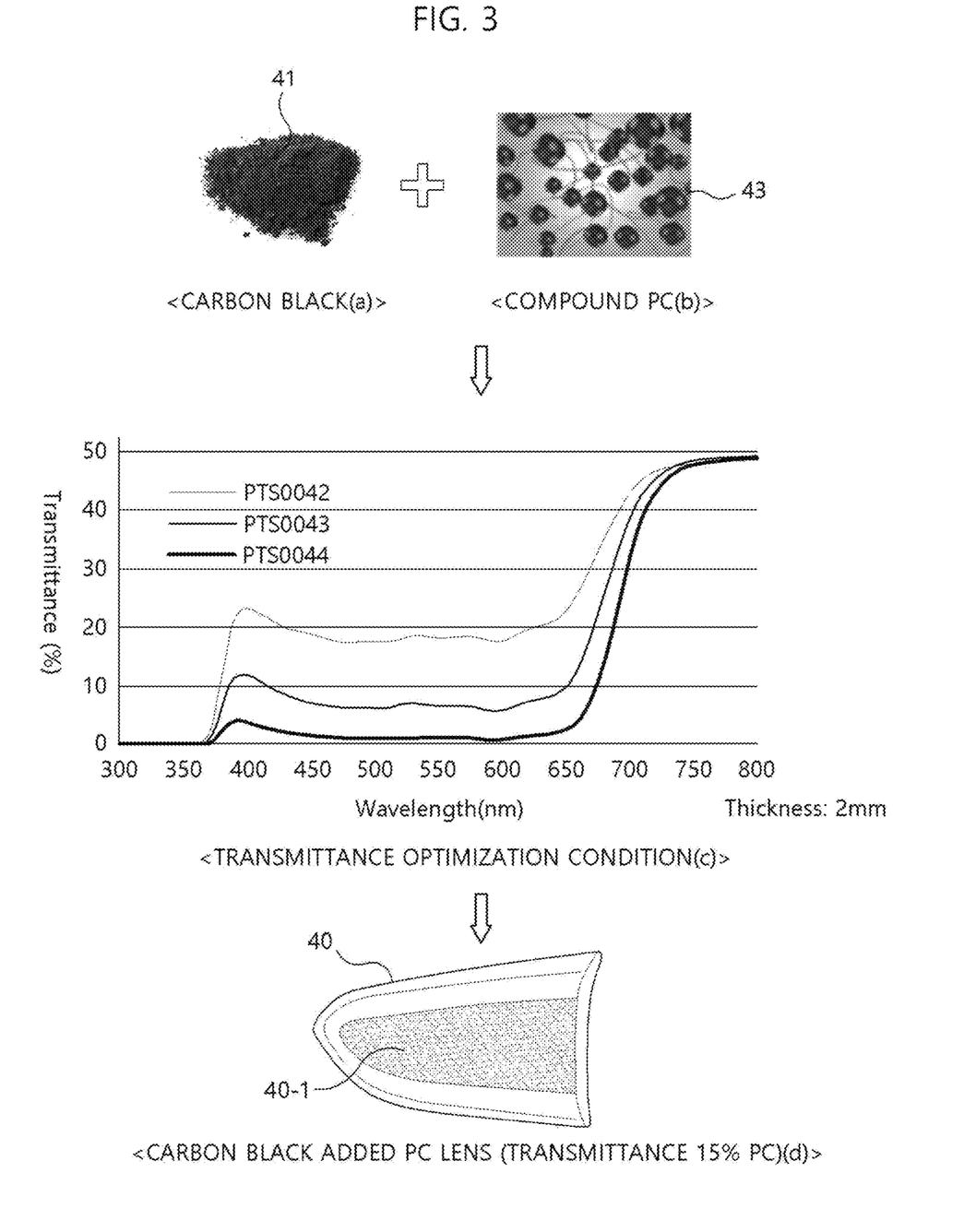
FIG. 3 is an example of manufacturing an outer lens of the hidden lamp module according to the present disclosure.

Referring to FIG. 3, the outer lens 40 uses a carbon powder 41 and a compound PC 43 as a material, and is manufactured in the process of preparing a carbon powder material as a color additive (a) ->manufacturing a compound PC (b) ->adjusting the transmittance optimization (c) ->manufacturing a PC with the transmittance of 15% with carbon powder added thereto (d). In this case, "->" refers to a proceeding order o procedure of the process in which the color of the carbon powder 41 with the compound PC color additive added thereto enters between the compound PCs 43 through spreading to change the clear state into a semi-clear black state.

In particular, the adjusting of the transmittance optimization (c) adjusts an amount of addition of the carbon powder 41 that is the color additive that the more addition in the process of manufacturing the clear PC plastic in the conventional method, the lower the light transmittance rate, forming a dark black feeling.

For example, a line diagram of transmittance wavelength in the adjusting of the transmittance optimization (c) shows that the color exposure surface 40-1 in black is set at the light transmittance of about 15% that is an optimize level in the light transmittance area of about 10 to 20%. This reason is why it can be seen that the transmittance in a range of visible light wavelength recognizable by people can be different for each type of black even if the line diagram can appear to be the same black in the people's eyes, which enables the selection of transmittance of an optimal black original material capable of meeting the lamp light distribution regulations even while expressing the black feeling well when the lamp is not lit depending upon a change in transmittance according to the degree of adding the carbon black.

Figure 4:
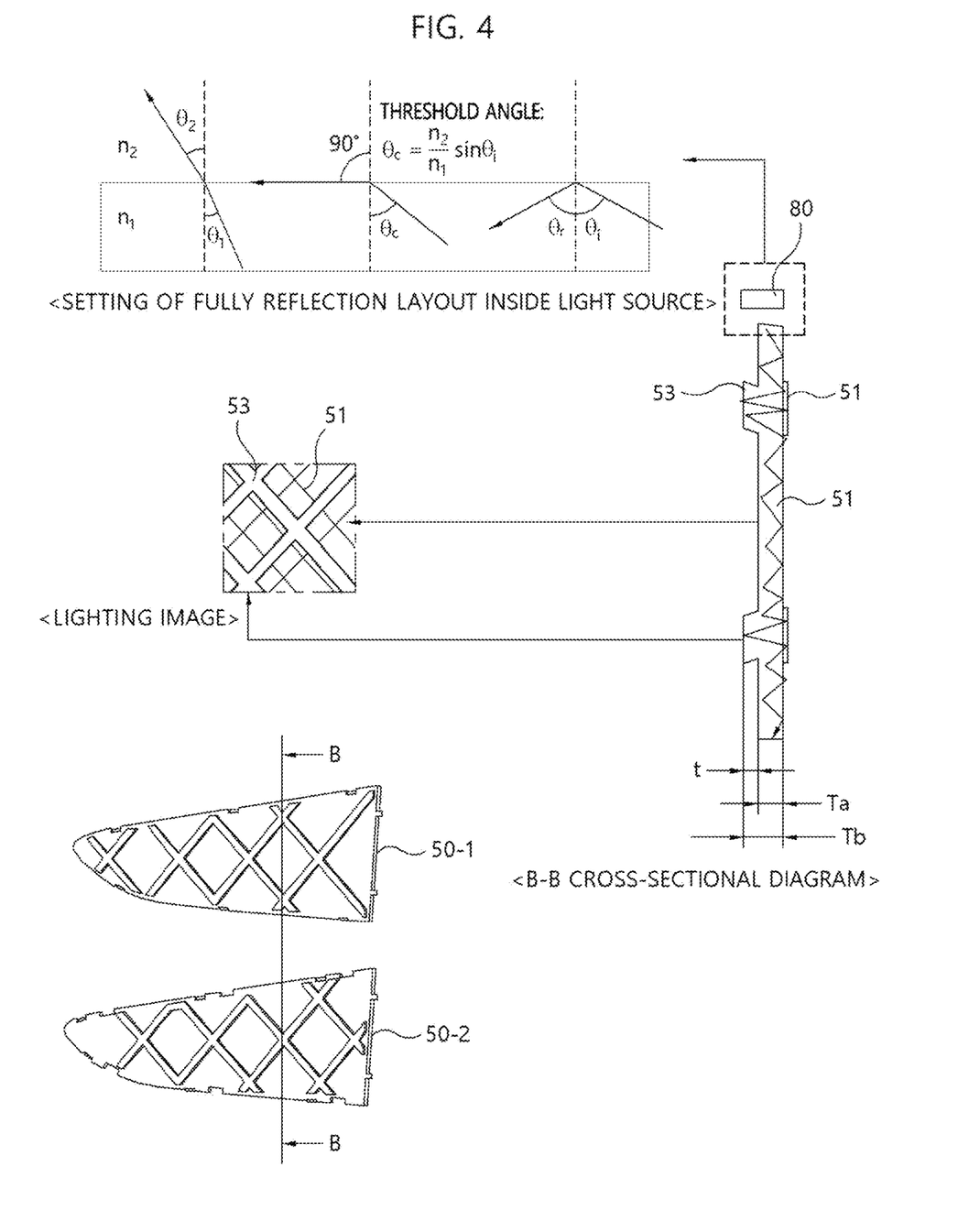
FIG. 4 is an inner lens structure of the hidden lamp module according to the present disclosure.

Referring to FIG. 4, the first and second layer lenses 50-1, 50-2 have a thickness difference (t) between a lens thickness (Ta) of the lens body 51 and an optic thickness (Tb) of the optic projection 53. In this case, the thickness difference (t) is "t =Tb - Ta" and the thickness of the optic projection 53 is formed larger than the thickness of the lens body 51.

Therefore, since the lens body 51 having a relatively smaller thickness is a section having the small thickness and no corrosion due to the corrosion surface 55, most of the light from the light source 80 is fully reflected and does not come out therefrom, thereby making the lens body surface visible in soft light. On the other hand, since the optic projection 53 having a relatively large thickness is a section having the large thickness and corrosion due to the corrosion surface 55, the section having the large thickness and the corrosion makes the image pattern clearly visible due to the light-blurring effect.

Therefore, each of the first and second layer lenses 50-1, 50-2 can form the lamp image or the lighting image that highlights the image pattern with the soft light of the lens body 51 compared to the vivid light of the optic projection 53 having the thickness difference (t).

Further, the lens body 51 of the first and second layer lenses 50-1, 50-2 has the inner full-reflection arrangement location with the light source 80 and therefore, the light from the light source 80 is radiated at a specific threshold angle or more, which can allow the light to be fully reflected inside the lens body, thereby largely enhancing the light efficiency.

Figure 5:
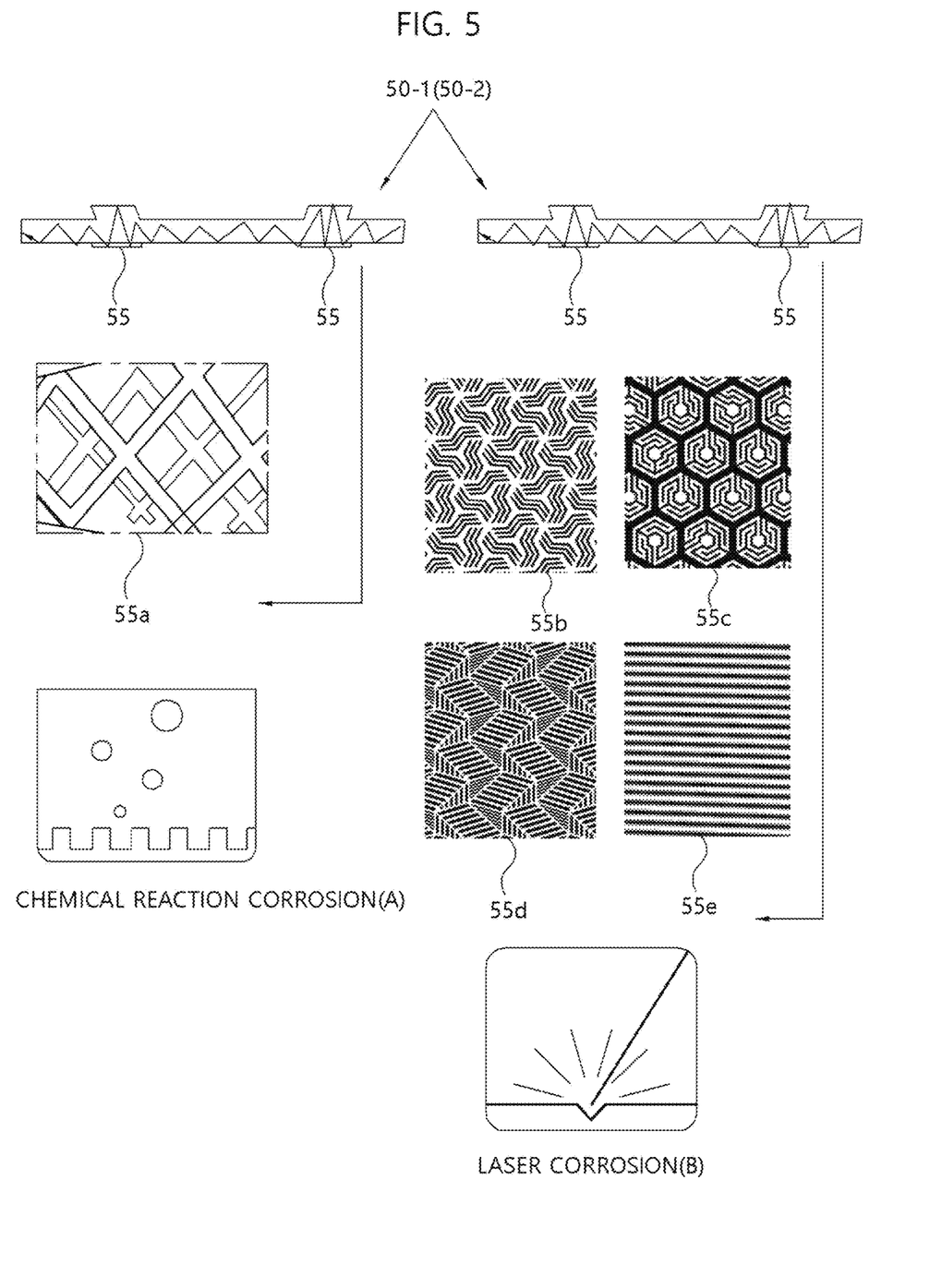
FIG. 5 is an example of forming corrosion patterns of first and second layer lenses constituting the inner lens according to the present disclosure.

Referring to FIG. 5, the corrosion surfaces 55 on the lens body 51 sides of the first and second layer lenses 50-1, 50-2 are formed along the optic projections 53 and can be formed in various patterns due to chemical reaction corrosion (A) or laser corrosion (B). In this case, the corrosion surface 55 is formed on the surface facing the optic projection 53, and the chemical reaction corrosion (A) or the laser corrosion (B) is formed on the inner surface of the lens body 51 to be convex.

For example, the chemical reaction corrosion (A) forms a first corrosion pattern 55a in an embossing shape in such a way that a fine light-forming pattern is implemented on the surface of the lens body using the chemical reaction. In this case, the first corrosion pattern 55a has a rectangular cross-sectional structure and is formed in a repeated embossing shape.

On the other hand, the laser corrosion (B) forms second, third, fourth, and fifth corrosion patterns 55b, 55c, 55d, and 55e of various concepts in such a way that a fine light-forming pattern is implemented on the surface of the lens body through laser radiation.

In particular, each of the second, third, fourth, and fifth corrosion patterns 55b, 55c, 55d, and 55e has an advantage of implementing a detailed lighting pattern difference through a fine pattern change compared to the first corrosion pattern 55a.

For example, the second corrosion pattern 55b can be formed in a figure pattern, the third corrosion pattern 55c can be formed in a pentagonal pattern, the fourth corrosion pattern 55d can be formed in a wave pattern, and the fifth corrosion pattern 55e can be formed in a straight pattern.

Figure 6:
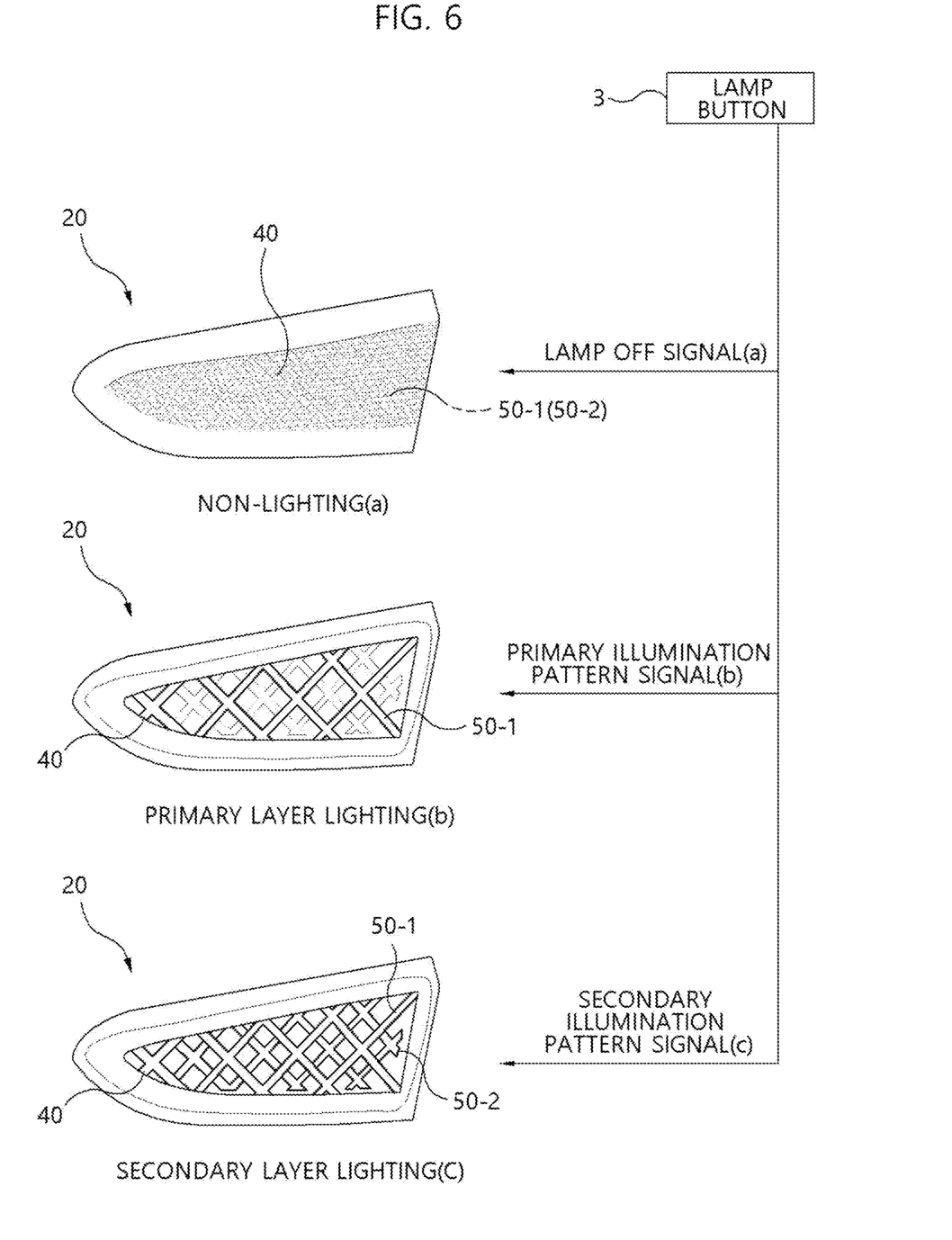
FIG. 6 shows a state of implementing a deposition image and a lamp image of the hidden light lamp according to the present disclosure.

Subsequently, FIG. 6 shows that the hidden light lamp 10 forms the deposition image in black when the light source 80 is not lit and the lamp image or the lighting image of at least two stages when lit. As shown, the lamp button 3 generates a lamp off signal (a)/a primary illumination pattern signal (b)/a secondary illumination pattern signal (c) sent to the control module 90. In this case, the control module 90 controls the power supply of the light source 80.

For example, the lamp off signal (a) is a situation where the lamp is not lit, which means that both the light source 80 of the first layer lens 50-1 side and the light source 80 of the second layer lens 50-2 side are in a state where the power supply is cut off, and therefore, the outer lens 40 is recognized as black due to the light transmittance of about 15% of the color exposure surface 40-1 exposed to the outside, and the black makes the deposition image as if there is no lamp because the lamp module 20 is not distinguished from the black vehicle body.

For example, the primary illumination pattern signal (b) is a primary lamp lighting situation (e.g., low beam), which is a state where the power supply of the light source 80 of the second layer lens 50-2 side is cut off, but the light source 80 of the first layer lens 50-1 side is in a power supply state, and therefore, the light fully reflected from the first layer lens 50-1 comes from the color exposure surface 40-1 of the outer lens 40 at the light transmittance of about 15%.

Therefore, the outer lens 40 forms a lamp image or a lighting image in the image pattern formed by the optic projection 53 of the first layer lens 50-1, and therefore, the lamp module 20 is changed into a lamp device and distinguished from the vehicle body to be recognized from the outside. This state can be a low beam of a typical vehicle lamp.

Further, the secondary illumination pattern signal (c) is in a secondary lamp lighting situation (e.g., high beam), which means that the light source 80 of the second layer lens 50-2 side is also in the power supply state in the power supply state of the light source 80 of the first layer lens 50-1 side.

Therefore, the outer lens 40 forms a lamp image or a lighting image in an overlapped image pattern obtained by combining the image pattern formed by the optic projection 53 of the first layer lens 50-1 and the image pattern formed by the optic projection 53 of the second layer lens 50-2, and therefore, the lamp module 20 is changed into the lamp device and distinguished from the vehicle body to be recognized from the outside more strongly. This state can be a high beam of a typical vehicle lamp.

As described above, the hidden lamp module 20 controlled by the control module 90 implements the deposition image with the outer lens 40 having the color exposure surface 40- 1 to which carbon is applied, the hidden light lamp 10 is characterized by the black image type hidden light system beyond the limitation of the AL deposition image that has the weak homogeneity with the color of the vehicle body, and through the black image type hidden light system, the vehicle lamp can be changed from the first generation hidden light to which the AL is applied into the second generation hidden light to which the black is applied.

Figure 7:
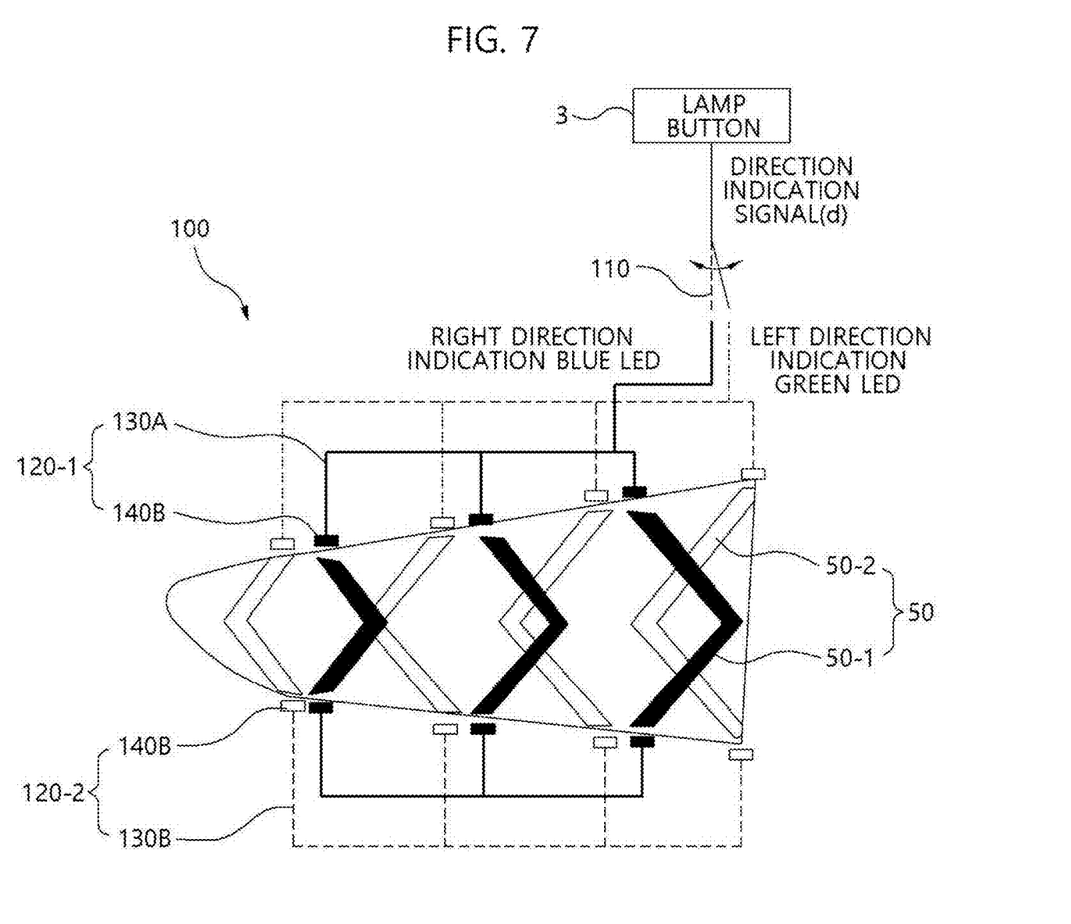
FIG. 7 is an example in which the hidden light lamp according to the present disclosure is implemented as a communication lamp for a vehicle using an optic image pattern difference of the inner lens.

Meanwhile, FIG. 7 shows that the hidden light lamp 10 is configured as a communication lamp 100. As shown, the communication lamp 100 is composed of a signal switching unit 110 and direction indication signal modules 120-1, 120-2 based on the hidden lamp module 20.

For example, the hidden lamp module 20 is composed of the lamp housing 30, the outer lens 40, the inner lens 50 of the first and second layer lenses 50-1, 50-2, and the light source 80, and therefore, is the same as the hidden lamp module 20 shown in FIGS. 1 to 6.

For example, the signal switching unit 110 converts the direction indication signal (d) of the lamp button 3 into a right direction indication blue LED lighting signal and a left direction indication green LED lighting signal.

Specifically, the direction indication modules 120-1, 120-2 are composed of first and second direction indication modules 120-1, 120-2 and are selected by the signal switching unit 110, and the first and second direction indication modules 120-1, 120-2 are lit as the image patterns by the optical projections 53 of the first and second layer lenses 50-1, 50-2.

For example, the first direction indication module 120-1 is combined with the first layer lens 50-1 to operate as the right direction indication lamp, and the second direction indication module 120-2 is combined with the second layer lens 50-2 to operate as the left direction indication lamp.

In particular, the first direction indication module 120-1 is composed of a first signal line 130A selectively connected to the signal switching unit 110 to supply power and first light sources 140A of blue LEDs located above/under the first layer lens 50-1. Further, the second direction indication module 120-2 is composed of a second signal line 130B selectively connected to the signal switching unit 110 to supply power and second light sources 140B of green LEDs located above/under the second layer lens 50-2.

Therefore, the communication lamp 100 is not distinguished from the black vehicle body with the color exposure surface 40-1 of the outer lens 40 like the hidden light system 10 when not lit, thereby making the deposition image as if there is no lamp.

On the other hand, when lit, the communication lamp 100 can be operated as the right direction indication lamp in which a blue arrow is lit through the first direction indication module 120-1 by being selectively connected with the signal switching unit 110 or the left direction indication lamp in which a green arrow is lit through the second direction indication module 120-2.

As described above, the hidden light lamp 10 uses the characteristics of the hidden lamp module 20, that is, the characteristics in which the light of the light source 80 is fully reflected to the inner lens 50 in the inner space of the lamp housing 30 whose exposure to the outside is blocked at the light transmittance of the outer lens 40, which forms the deposition image with the color exposure surface 40-1, and the image pattern formed by the optic projection 53 of the inner lens 50 transmits the outer lens 40 and is formed as the lamp image, and therefore, can be implemented as the communication lamp 100 that is the lamp for the vehicle that forms the lamp image with the image pattern in a state of being lit by the hidden lamp module 20.

Figure 8:
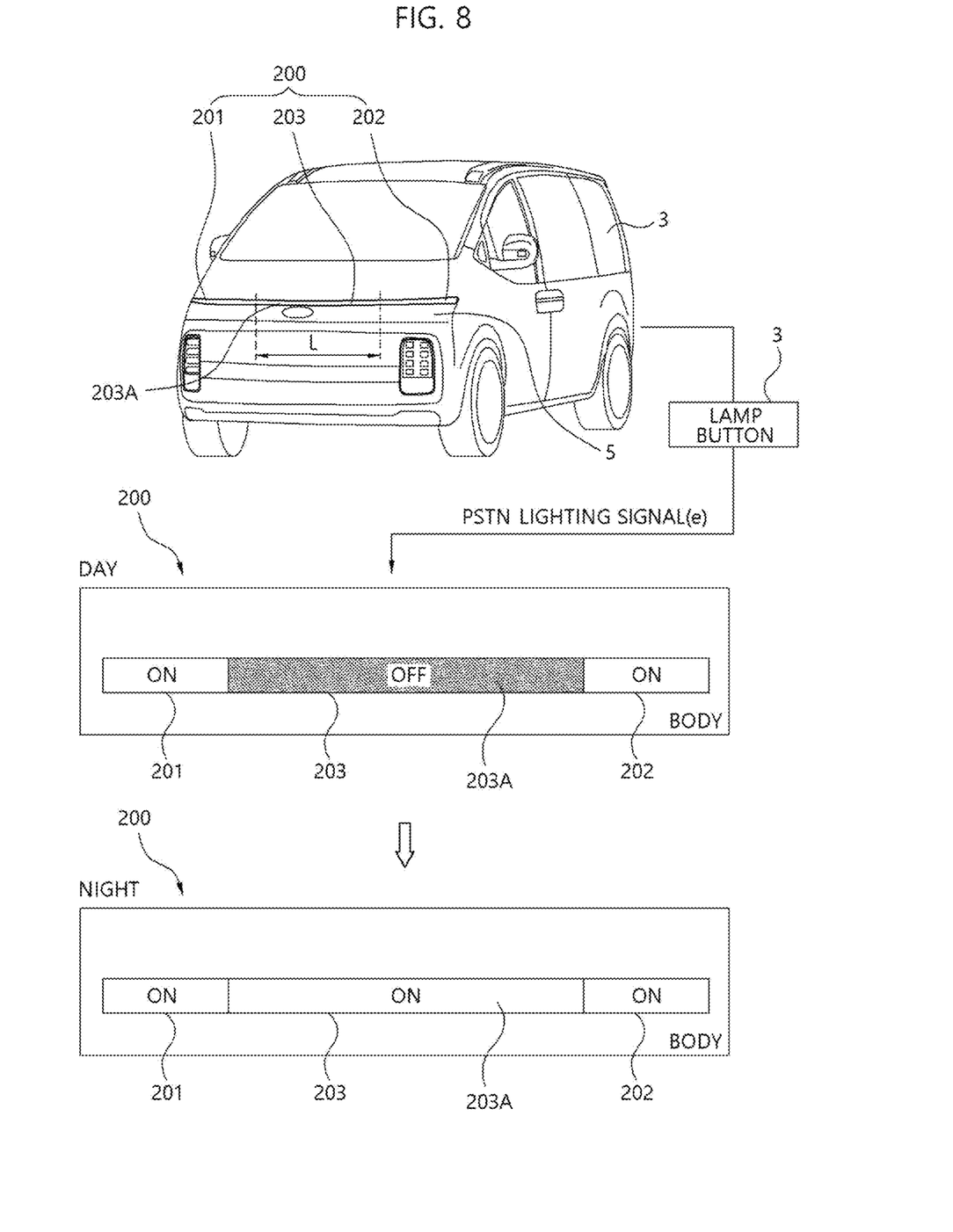
FIG. 8 is an example in which the hidden light lamp according to the present disclosure is applied as a composite lamp for the vehicle using a light transmittance of a black outer lens.

Further, FIG. 8 shows that the hidden light lamp 10 is configured as a composite lamp 200. In this case, the vehicle body 5 is shown as an engine hood and fender portion of the vehicle, but can be a vehicle side body using a door or a trunk lid on the rear of the vehicle.

As shown, the composite lamp 200 is formed in a shape of crossing the width of the vehicle body 5, and configured as a position lamp (PSTN) 203 located in an intermediate section (L) between a left daytime running lamp (DRL) 201 and a right daytime running lamp (DRL) 202.

For example, the left/right DRLs 201, 202 are lamps configured to easily recognize the vehicle by other drivers and pedestrians by automatically lighting the front left/right lights when an ignition switch is turned on, and the PSTN 203 is a lamp configured to indicate the presence and width of the vehicle ahead at night.

However, there is a difference in which the PSTN 203 is connected to the lamp button 3 of FIG. 1 and operated by a PSTN lighting signal (e), and in particular, as shown in FIG. 3, the outer lens 40 having the color exposure surface 40-1 recognized as black due to the light transmittance of about 15% is changed into the black outer lens 203A that is the outer lens and exposed to the outside.

Therefore, the composite lamp 200 forms a lamp image or a lighting image at the light transmittance of about 15% of the outer lens 40 together with the lighting state of the left/right DRLs 201, 202 when lit.

On the other hand, the composite lamp 200 is not distinguished from the black vehicle body 5 with the color exposure surface 40-1 of the outer lens 40 like the hidden light system 10 when the lamp is not lit, and therefore, makes the deposition image as if there is no PSTN 203 located in an intermediate section (L) between the left/right DRLs 201, 202. Therefore, the composite lamp 200 has the effect of appealing to consumers with the same feeling as the surrounding black parts while increasing the aesthetics of the vehicle body 5 with the black of the outer lens 40.

As described above, the hidden light lamp 10 uses the characteristics of the hidden lamp module 20, that is, the characteristics in which the light of the light source 80 is fully reflected to the inner lens 50 in the inner space of the lamp housing 30 whose exposure to the outside is blocked at the light transmittance of the outer lens 40, which forms the deposition image with the color exposure surface 40-1, and the image pattern formed by the optic projection 53 of the inner lens 50 transmits the outer lens 40 and is formed as the lamp image, and therefore, can be implemented as the composite lamp 200 or the PSTN 203 that is the lamp for the vehicle that forms the deposition image with the color of the color exposure surface 40-1 by the hidden lamp module 20 in a state of being not lit.

As described above, the black image type hidden light system 10 applied to the vehicle 1 according to the present exemplary embodiment is composed of a control module 90 coupled to the hidden lamp module 20 in which the outer lens 40, the inner lens 50, and the light source 80 are assembled in the lamp housing 30, and the color exposure surface 40-1 of the outer lens 40 covers the inner space of the lamp housing 30 to block the exposure to the outside and transmits the light fully reflected to the inner lens 50 to the outside, thereby forming the black deposition image when not lit and the lamp image or the lighting image when lit, and in particular, optimizes the light transmittance with an amount of addition of the carbon black material mixed with the polycarbonates (PC) material, thereby substantially enabling the mass-production beyond the limitation of the AL deposition image.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub- combinations as are within their true spirit and scope.

The invention claimed is:
1. A hidden light lamp comprising:
a lamp housing having an inner space, wherein the inner space includes a light source;
an outer lens having an exposure to an outside, wherein the exposure is partially blocked by covering the inner space by a colored outer surface that transmits the light generated by the light source at a light transmittance; and
an inner lens configured to send the light toward the outer lens by fully reflecting the light in the inner space;
wherein the inner lens forms a lighting pattern by an optic structure when the light source is lit;

wherein the inner lens is formed so that the optic structure has a thickness difference with a lens body forming total internal reflection;

wherein the thickness difference causes total internal reflected light of the optic structure to be relatively brighter than the light of the lens body;

wherein the inner lens is composed of a first layer lens and a second layer lens which are positioned a distance away from each other, wherein each of the first layer lens and the second layer lens forms different lighting patterns;

wherein the optic structure of the first layer lens has a divergence structure and spreads the light to the outer lens, and wherein the optic structure of the second layer lens has a convergence structure and collects the light into the first layer lens.

2. The hidden light lamp of claim 1, wherein the outer lens forms a black color surface, and the black color surface comprises a mix of polycarbonate (PC) material and a carbon powder material to form a black surface.

3. The hidden light lamp of claim 1, wherein the light transmittance is 15%.

4. The hidden light lamp of claim 1 wherein the inner lens forms a corrosion pattern at a location facing the optic structure on the lens body, and wherein the corrosion pattern surface is formed on an inner surface of the lens body to be convex.

5. The hidden light lamp of claim 1, wherein the first layer lens and the second layer lens mix the lighting patterns when the light source is lit.

6. The hidden light lamp of claim 1, wherein each of the first layer lens and the second layer lens is provided with the light source, and wherein the light source is located on an upper portion or a lower portion of each of the first layer lens and the second layer lens.

7. The hidden light lamp of claim 1, comprising:
a signal switching unit configured to convert a direction indication signal of a lamp button;
a first direction indication module connecting a first light source of the light source located in the first layer lens of the inner lens to the signal switching unit; and
a second direction indication module connecting a second light source of the light source located in the second layer lens of the inner lens to the signal switching unit.

8. The hidden light lamp of claim 7,
wherein the optic structure comprises a first optic structure and a second optic structure;
wherein the light of the first light source illuminates the lighting pattern of the first optic structure formed on the first layer lens,
wherein the light of the second light source illuminates the lighting pattern of the second optic structure formed on the second layer lens, and
wherein a shape of the lighting pattern of the first layer lens and a shape of the image pattern of the second layer lens indicate a left direction and a right direction of a vehicle proceeding direction.

9. The hidden light lamp of claim 1,
wherein the outer lens is configured as an outer lens of a position lamp (PSTN), which is a lamp configured to indicate the presence and width of a vehicle ahead at night
wherein the position lamp (PSTN) is located between a left daytime running lamp (DRL) and a right daytime running lamp (DRL); and
wherein the position lamp (PSTN) is connected to a lamp button and operated by a PSTN lighting signal.

10. A vehicle comprising:
a hidden lamp module in which light of a light source is total internal reflected to an inner lens formed with an optic structure in an inner space of a lamp housing, wherein the lamp housing includes an exposure to the outside which is partially blocked at a light transmittance of a colored outer surface of an outer lens, and the outer lens transmits a lighting pattern of the optic structure at the light transmittance;
a lamp configured to form a color of the colored outer surface in the same color as a vehicle body;
wherein the inner lens forms a lighting pattern by an optic structure when the light source is lit;
wherein the inner lens is formed so that the optic structure has a thickness difference with a lens body forming total internal reflection;
wherein the thickness difference causes the total internal reflected light of the optic structure to be relatively brighter than the light of the lens body;
wherein the inner lens is composed of a first layer lens and a second layer lens which are positioned a distance away from each other,
wherein each of the first layer lens and the second layer lens forms different lighting patterns;
wherein the optic structure of the first layer lens has a divergence structure and spreads the light to the outer lens, and
wherein the optic structure of the second layer lens has a convergence structure and collects the light into the first layer lens.

11. The vehicle of claim 10, wherein the lamp is a hidden light lamp, and wherein the hidden light lamp forms a deposition pattern image with the colored outer color exposure surface in a state of being not lit, and forms a lamp pattern image with the lighting image pattern in a state of being lit, by the hidden lamp module.

12. The vehicle of claim 10,
wherein the lamp is a communication lamp, and
wherein when the communication lamp is lit, the hidden lamp module forms a lamp pattern with the lighting pattern, and the lamp pattern indicates a left direction and a right direction of a vehicle proceeding direction.

13. The vehicle of claim 10,
wherein the lamp is a composite lamp in which a position lamp (PSTN) is located between a left daytime running lamp (DRL) and a right daytime running lamp (DRL), and
wherein when the position lamp (PSTN) is not lit, the hidden lamp module forms a deposition pattern image with the colored outer color exposure surface.

* * * * *